(12) United States Patent
Hausman, Jr. et al.

(10) Patent No.: US 7,259,524 B2
(45) Date of Patent: Aug. 21, 2007

(54) APPARATUS AND METHODS FOR REGULATING DELIVERY OF ELECTRICAL ENERGY

(75) Inventors: Donald F. Hausman, Jr., Macungie, PA (US); Eric S. Lavin, Burlington, NJ (US); Yang Boon Quek, Ypsilanti, MI (US); Audwin Cash, Bethlehem, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 360 days.

(21) Appl. No.: 10/865,083

(22) Filed: Jun. 10, 2004

(65) Prior Publication Data

US 2005/0275354 A1 Dec. 15, 2005

(51) Int. Cl.
*G05F 1/00* (2006.01)
(52) U.S. Cl. .................. 315/291; 315/307; 315/294; 315/306; 315/DIG. 4; 323/243
(58) Field of Classification Search ................ 315/246, 315/287, 291, 307, 194, 294, 306, DIG. 4; 323/237–246
See application file for complete search history.

(56) References Cited

U.S. PATENT DOCUMENTS

| | | | |
|---|---|---|---|
| 4,360,783 A * | 11/1982 | Nagasawa et al. .......... 327/349 |
| 4,876,498 A | 10/1989 | Luchaco et al. ............ 323/300 |
| 4,954,763 A | 9/1990 | Kumar et al. ............... 318/605 |
| 5,239,255 A * | 8/1993 | Schanin et al. ............. 323/237 |
| 5,691,628 A * | 11/1997 | Martin ....................... 323/237 |
| 5,754,036 A * | 5/1998 | Walker ....................... 323/237 |
| 6,091,205 A * | 7/2000 | Newman et al. ............ 315/194 |
| 6,172,466 B1 * | 1/2001 | Ki et al. ..................... 315/224 |
| 6,380,692 B1 * | 4/2002 | Newman et al. ............ 315/194 |
| 6,603,276 B2 * | 8/2003 | Chansky et al. ............ 315/362 |
| 7,030,569 B2 * | 4/2006 | Gray .......................... 315/224 |
| 7,190,125 B2 * | 3/2007 | McDonough et al. ....... 315/291 |
| 2004/0160794 A1 * | 8/2004 | Lin ............................. 363/98 |

FOREIGN PATENT DOCUMENTS

DE 44 06 371 A 1 * 8/1995

* cited by examiner

*Primary Examiner*—Haissa Philogene
(74) *Attorney, Agent, or Firm*—Woodcock Washburn LLP

(57) ABSTRACT

Apparatus and methods for regulating delivery of electrical energy to a lighting load are disclosed. An electrical waveform is received from a source of electrical energy. An integration value is generated based on a square of an amplitude of the received waveform. Electrical energy is delivered to the load until the integration value exceeds a threshold value. Thereafter, the delivery of electrical energy to the load is discontinued.

66 Claims, 15 Drawing Sheets

APPARATUS AND METHODS FOR REGULATING DELIVERY OF ELECTRICAL ENERGY

FIELD OF THE INVENTION

Generally, the invention relates to apparatus and methods for regulating delivery of electrical energy to a load. More particularly, the invention relates to apparatus and methods for generating an integration value by integrating a signal representative of a square of an amplitude of a received electrical waveform and causing electrical energy to be delivered to the load until it has been determined that the integration value has exceeded a threshold value.

BACKGROUND OF THE INVENTION

FIG. 1 depicts a typical dimmer circuit 10 comprising a source of alternating-current (AC) power, or power supply, 12, a dimmer 14, and a load 16. The load 16 may be a lamp set comprising one or more lamps adapted to be connected between the hot and neutral terminals of a standard source of AC power. The lamp set may include one or more incandescent lamps and/or other loads such as electronic low voltage (ELV) or magnetic low voltage (MLV) loads, for example.

The power supply 12 supplies an AC waveform to the dimmer 14. The dimmer 14 regulates the delivery of electrical energy from the power supply 12 to the load 16. The dimmer may include a controllably conductive device 18 and a control circuit 20. The controllably conductive device 18 may include an input 22 adapted to be coupled to the power supply 12, an output 24 adapted to be coupled to the load 16, and a control input 26. The control circuit 20 may have an input 28 coupled to the input 22 of the controllably conductive device 18 and an output 30 coupled to the control input 26 of the controllably conductive device 18.

A typical, AC, phase-control dimmer regulates the amount of energy supplied to the load 16 by conducting for some portion of each half-cycle of the AC waveform, and not conducting for the remainder of the half-cycle. Because the dimmer 14 is in series with the load 16, the longer the dimmer 14 conducts, the more energy will be delivered to the load 16. Where the load 16 is a lamp set, the more energy delivered to the load, the greater the light intensity level of the lamp set. In a typical dimming scenario, a user may adjust a control to set the light intensity level of the lamp set to a desired light intensity level. The portion of each half-cycle for which the dimmer conducts is based on the selected light intensity level.

The controllably conductive device 18 may include a solid state switching device, which may include one or more triacs, which may be thyristors or similar control devices. Conventional light dimming circuits typically use triacs to control the conduction of line current through a load, allowing a predetermined conduction time, and control the average electrical power to the light. One technique for controlling the average electrical power is forward phase control. In forward phase control, a switching device, which may include a triac, for example, is turned on at some point within each AC line voltage half cycle and remains on until the next current zero crossing. Forward phase control is often used to control energy to a resistive or inductive load, which may include, for example, a magnetic lighting transformer.

Because a triac device can only be selectively turned on, a power-switching device, such as a field effect transistor (FET), a MOSFET (metal oxide semiconductor FET), or an insulated gate bipolar transistor (IGBT), for example, may be used for each half cycle of AC line input when turn-off phase is to be selectable. In reverse phase control, the switch is turned on at a voltage zero crossing of the AC line voltage and turned off at some point within each half cycle of the AC line current. A zero-crossing is defined as the time at which the voltage equals zero at the beginning of each half-cycle. Reverse phase control is often used to control energy to a capacitive load, which may include for example, an electronic transformer connected low voltage lamp.

The switching device may have a control or "gate" input 26 that is connected to a gate drive circuit, such as an FET drive circuit, for example. Control inputs on the gate input render the switching device conductive or non-conductive, which in turn controls the energy supplied to the load. FET drive circuitry typically provides control inputs to the switching device in response to command signals from a microcontroller. FET protection circuitry may also be provided. Such circuitry is well known and need not be described herein.

The microcontroller may be any processing device such as a programmable logic device (PLD), a microprocessor, or an application specific integrated circuit (ASIC), for example. Power to the microcontroller may be supplied by a power supply. A memory, such as an EEPROM, for example, may also be provided.

Inputs to the microcontroller may be received from a zero-crossing detector. The zero-crossing detector determines the zero-crossing points of the input AC waveform from the AC power supply 12. The microcontroller sets up gate control signals to operate the switching device to provide voltage from the AC power supply 12 to the load 16 at predetermined times relative to the zero-crossing points of the AC waveform. The zero-crossing detector may be a conventional zero-crossing detector, and need not be described here in further detail. In addition, the timing of transition firing pulses relative to the zero crossings of the AC waveform is also known, and need not be described further.

FIGS. 2A and 2B depict example prior-art dimmed waveforms. Shown in FIG. 2A is a single-frequency AC waveform having an amplitude profile $v_1(t)$ during a first half-cycle $T_H$ and an amplitude profile $v_2(t)$ during a second half-cycle $T_{H'}$. The absolute value of peak amplitude during each half cycle is A. Thus, the AC waveform delivered to the dimmer is the same for both half-cycles. Because the dimmer conducts for the same amount of time, $t_C$, each half-cycle, $t_H$, the amount of energy delivered to the load during the second half-cycle will be the same as the amount of energy delivered during the first half-cycle. Though this is usually acceptable, amplitude changes in the AC waveform may cause fluctuations in the amount of energy actually delivered to the load from half-cycle to half-cycle (e.g., the light level may fluctuate).

Shown in FIG. 2B, is a single-frequency AC waveform having an amplitude profile $v_1(t)$ during a first half-cycle $T_H$ and an amplitude profile $v_2(t)$ during a second half-cycle $T_{H'}$, wherein the absolute value of peak amplitude during the first half cycle is $A_1$ and the absolute value of peak amplitude during the second half cycle is $A_2$. As shown, the absolute value of peak amplitude, $A_2$, of the waveform during the second half-cycle is different from (e.g., lower than) the absolute value of peak amplitude, $A_1$, during the first half-cycle. Because the dimmer conducts for same amount of time, $t_C$, each half-cycle, the amount of energy delivered to the load during second half-cycle is different from (e.g., less than) the amount of energy delivered to the load during the first half-cycle. Hence, given a constant dimmer-conduction time, $t_C$, during each half-cycle, $T_H$, the root-mean-square voltage delivered to the load will change as the amplitude of the AC waveform changes.

In certain installations, such as cruise ships or other such marine vessels, for example, other loads may be driven from the same power source that drives the lighting. For example, a ship's engines may be driven by the same power source that drives the ship's lighting. As energy is delivered to the engines, the voltage waveform delivered to the lighting is often corrupted. Sometimes, the waveform varies wildly between one half-cycle and the next.

In such an installation, if the lighting is dimmed using a technique that provides for delivering electrical energy to the lighting for a fixed amount of time each half-cycle, the variations in the waveform result in varying amounts of energy being delivered to the load every half-cycle. Consequently, the lighting flickers. Such a condition is undesirable.

It would be desirable, therefore, if apparatus and methods were available to deliver roughly the same amount of energy every half-cycle, regardless of variations in the amplitude of the AC waveform from half-cycle to half-cycle.

SUMMARY OF THE INVENTION

The invention provides apparatus and methods for regulating delivery of electrical energy to a load. According to the invention, electrical energy is delivered to the load until it has been determined that the threshold amount of energy has been delivered. Once it has been determined that the threshold amount of energy has been delivered to the load, the delivery of electrical energy is discontinued.

The invention may be embodied in hardware, software, or a combination of hardware and software. A dimmer according to the invention may include a controllably conductive device and a control circuit. The controllably conductive device may include an input adapted to be coupled to a source of electrical energy, an output adapted to be coupled to the load, and a control input. The control circuit may have an input coupled to the input of the controllably conductive device and an output coupled to the controllably conductive device.

An example embodiment of a control circuit according to the invention may include a rectifier, a first comparator, a sawtooth wave generator, an integrator, a second comparator, and a drive circuit. The rectifier generates a rectified waveform having an amplitude representative of the absolute value of the amplitude of the alternating-current waveform. The first comparator receives the rectified waveform and a sawtooth waveform, and outputs a voltage-square pulse train based on a comparison of the rectified waveform and the sawtooth waveform. The integrator generates an integration signal based on the voltage-square pulse train. The integration signal is representative of the integral of the square of the alternating-current waveform. The second comparator outputs a control signal based on a comparison of the integration signal and a threshold value. The drive circuit regulates delivery of electrical energy to the load based on the control signal. If the amplitude of the integration signal exceeds the threshold, the drive circuit causes the delivery of electrical energy to be discontinued.

DETAILED DESCRIPTION OF ILLUSTRATIVE EMBODIMENTS

In general, the energy delivered to an undimmed load during a half-cycle of an input AC waveform is $$E = \int_0^{T_H} \frac{v^2(t)}{r(t)} dt, \quad (1)$$

where v(t) is the voltage of the input waveform as a function of time, r(t) is the resistance of the load as a function of time, t=0 is defined to be at the zero-crossing of the input waveform at which the half-cycle begins, and $T_H$ is the period of a half-cycle of the input waveform.

The energy delivered to a dimmed load during a half-cycle of the AC waveform is:

$$E = \int_0^{t_1} \frac{v^2(t)}{r(t)} dt, \quad (2)$$

where $t_1$ is the amount of time during the half-cycle (as measured from the zero-crossing) that electrical energy from the input waveform is delivered to the load.

In an example wherein the load is a lighting load (e.g., a lamp set that includes one or more lamps), the impedance of the load may be considered constant at steady-state (i.e., after the filament of the lamp has been heated to a steady-state temperature). The energy delivered to the load, therefore, becomes $$E = \frac{1}{R}\int_0^{t_1} v^2(t)dt. \tag{3}$$

Thus, the integral of $v^2(t)$ is representative of the energy delivered to the load, as R is constant. Considering the same example wherein the load is a lighting load, the average power delivered to the load during a half-cycle is $$\overline{P} = \frac{E}{T_H} = \frac{1}{R \cdot T_H}\int_0^{t_1} v^2(t)dt. \tag{4}$$

Thus, the integral of $v^2(t)$ is also representative of the average power delivered to the load, as R and $t_H$ are constant.

According to the invention, the amount of energy delivered to the load may be regulated by integrating $v^2(t)$ over time, and comparing the integrated value to a threshold value. The threshold value may be chosen such that the integral of $v^2(t)$ reaches the threshold value when a desired amount of energy has been delivered to the load.

Figure 3:
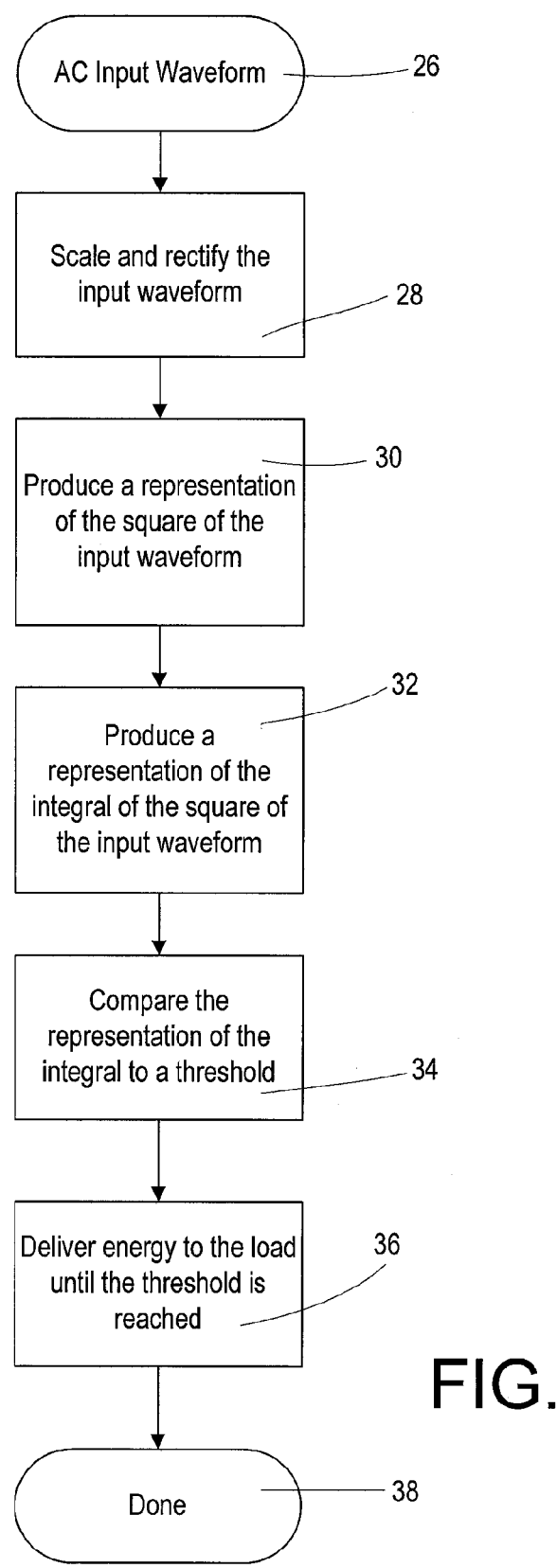
FIG. 3 depicts a method according to the invention for regulating delivery of electrical energy to a load.

FIG. 3 depicts a method according to the invention for regulating delivery of electrical energy to a load. The input to the process is an unregulated AC waveform at 26. The input waveform is scaled down and full-wave rectified at 28. At 30, a representation of the square of the input waveform is produced, wherein the representation may simply be the square of the input waveform. At 32, a representation of the integral of the square of the input waveform is produced, wherein this representation may simply be computed by integrating the representation of the square of the input waveform. The result of 32 is representative of the energy delivered to the load so far in the current half-cycle, and is compared to a threshold level that that corresponds to a desired intensity level of the load at 34. At 36, the power-switching device is driven according to the comparison between the threshold and the result of the integral. That is, energy is delivered to the load until the result of the integral reaches the threshold. After the threshold is reached, energy delivery is discontinued for that half-cycle. The process is complete at 38 and repeats for every half cycle.

Such a method may be implemented in hardware or software, or in a combination of hardware and software. Such a system may be employed in connection with an electronic dimmer. One or more electrical circuits may be used to perform the functions described. The methods of the invention may be implemented as one or more computer programs in one or more microprocessors.

Figure 4:
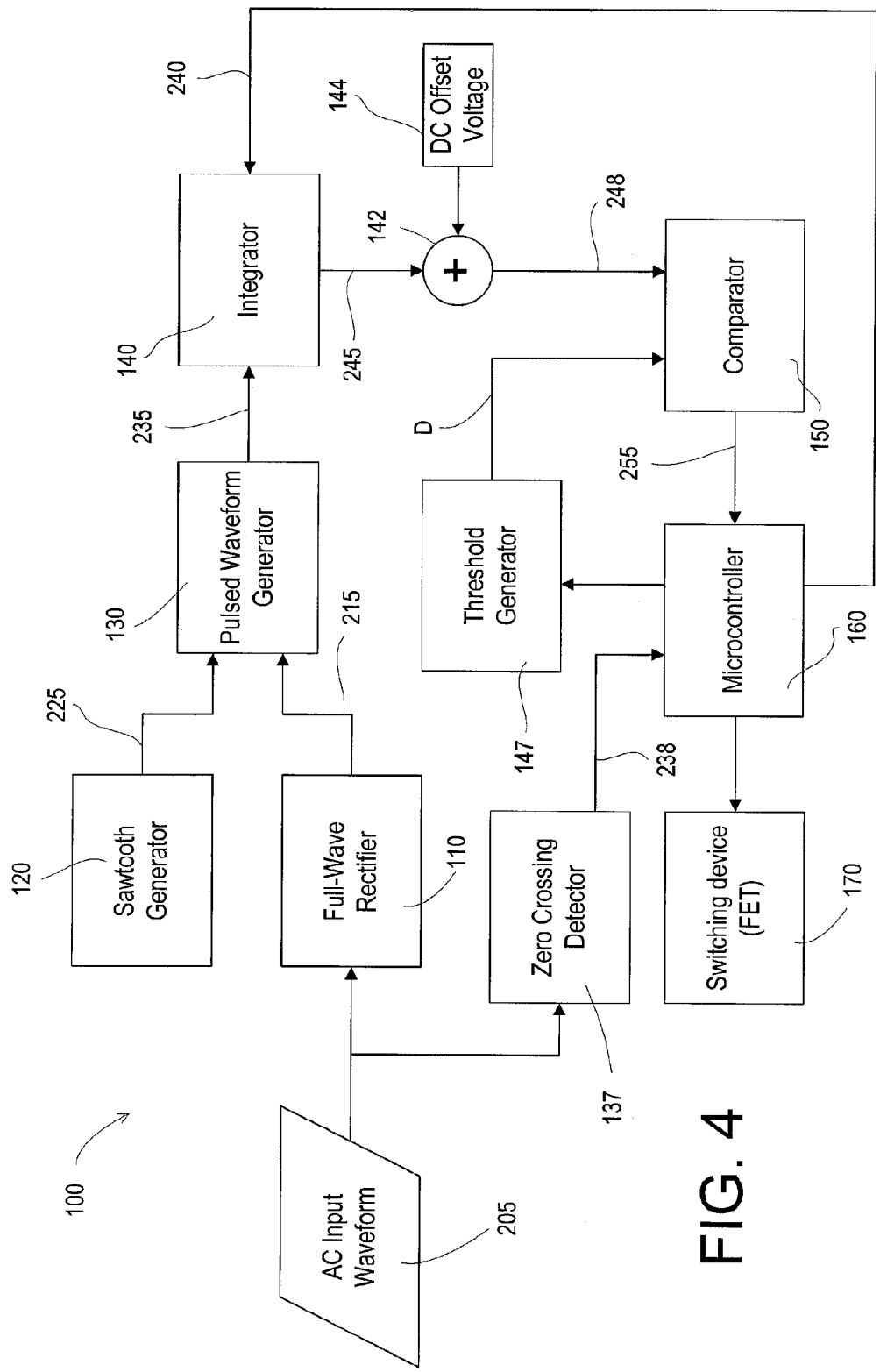
FIG. 4 is a functional block diagram of an example embodiment of apparatus according to the invention for regulating delivery of electrical energy to a load.

FIG. 4 is a functional block diagram of an example embodiment of a system 100 according to the invention for regulating electrical energy delivered to a load. FIGS. 5A-I depict waveforms at various points in the functional block diagram of FIG. 4.

Figure 5A:
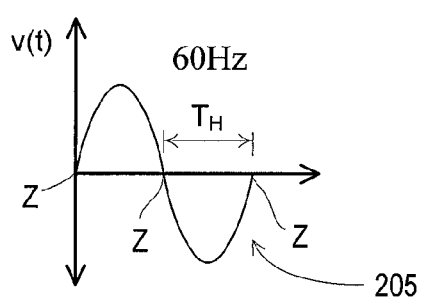
FIGS. 5A-I depict waveforms at various points in the functional block diagram of FIG. 4.

An input AC waveform 205 is provided to a full-wave rectifier 110. For simplicity of explanation, the input AC waveform 205 may be represented as a sine wave having a constant frequency, f, and a voltage amplitude, v(t), as shown in FIG. 5A. The period, $T_H$, of a half-cycle of the sine wave is ½f. A zero crossing, Z, occurs at the beginning and end of every half-cycle.

Figure 5B:
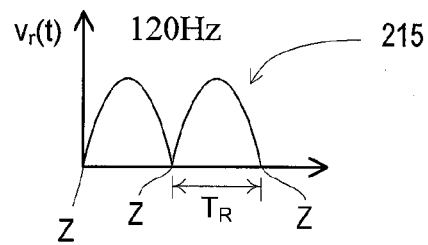
Figure 5C:
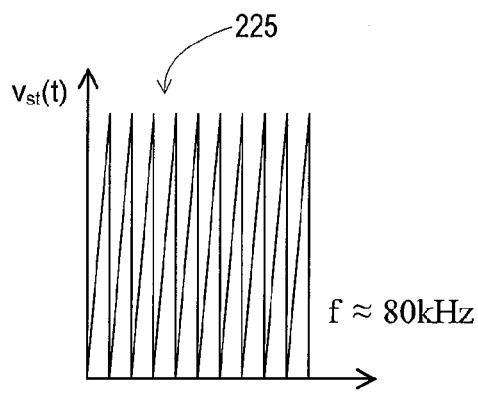
Figure 5D:
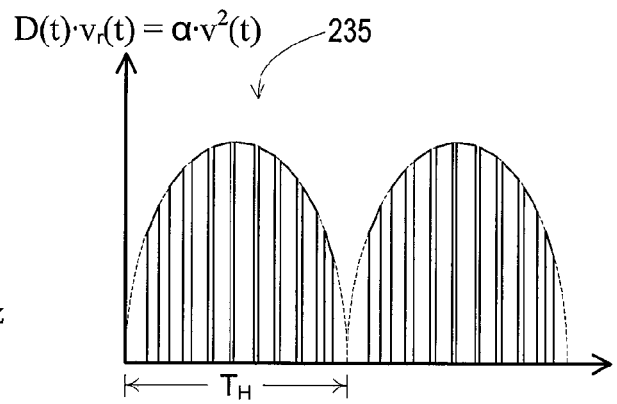

The full-wave rectifier 110 outputs a rectified voltage waveform 215 shown in FIG. 5B. The rectified voltage waveform 215 has a period, $T_R$, that is equal to the period, $T_H$, of a half-cycle of the input AC waveform 205, and an amplitude, $v_r(t)$, that is equal to the absolute value of the voltage amplitude v(t) of the input signal 205 or $$v_r(t)=|v(t)|. \tag{5}$$

The output of the full-wave rectifier 110 (rectified voltage waveform 215) is provided to a pulsed waveform generator 130.

A sawtooth generator 120 provides a sawtooth waveform 225 (shown in FIG. 5C) to the pulsed wave generator 130. If the amplitude, $v_r(t)$, of the rectified voltage waveform 215 is greater than the amplitude of the sawtooth waveform 225, then the pulsed waveform generator 130 outputs a signal having the amplitude of the rectified voltage waveform 215. If the amplitude, $v_r(t)$, of the rectified voltage waveform 215 is less than the amplitude of the sawtooth waveform 225, then the pulsed waveform generator 130 outputs a signal having a relatively low (logical zero) amplitude. Thus, the pulsed waveform generator 130 generates a pulsed waveform 235 (shown in FIG. 5D) having a duty cycle, D(t), that varies as the amplitude of the rectified voltage signal 215. That is, as the amplitude $v_r(t)$ of the rectified voltage signal 215 increases, the pulses out of the pulsed waveform generator 130 become wider (in the time domain) and greater in amplitude (voltage).

Figure 6:
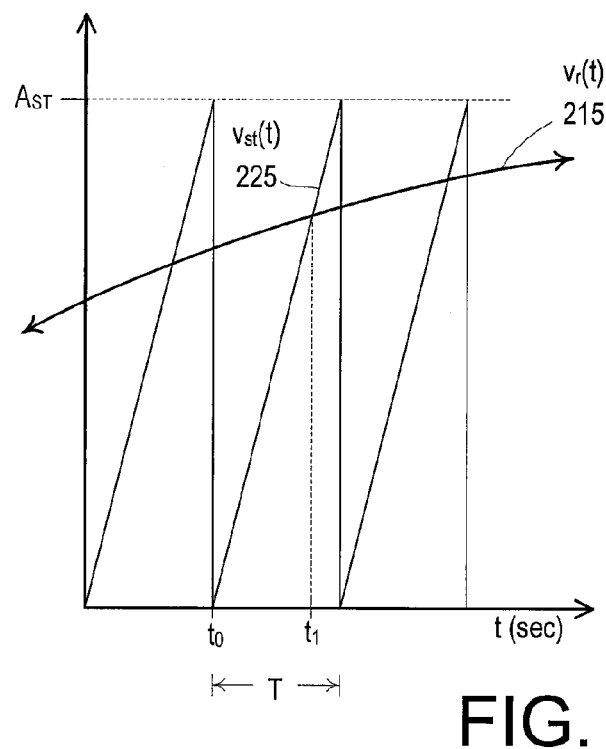
FIG. 6 shows a comparison of a rectified voltage waveform and a sawtooth waveform.

The relationship between the duty cycle D(t) of the pulsed waveform 235 and the amplitude $v_r(t)$ of the rectified voltage waveform 215 is such that $$D(t)=\alpha \cdot v_r(t), \tag{6}$$

where $\alpha$ is a constant. With reference to FIG. 6, equation (6) is derived by analyzing one period of the sawtooth waveform 225. It is known that the duty cycle of a signal is equal to the time that the signal is "high" divided by the period of the signal, or $$D(t)=t_{ON}/T, \tag{6a}$$

where $t_{ON}$ is the time that the output of the pulsed waveform generator 130 is "high" (i.e. the width of a pulse of pulsed waveform 235) and T is the period of the sawtooth waveform 225. Because of the operation of the pulsed waveform generator 130, the time that the pulsed waveform 235 is "high" is determined by the intersection point of the rectified voltage waveform 215 and the sawtooth waveform 225, i.e., $$t_{ON}=t_1-t_0, \tag{6b}$$

where $t_0$ is the start time for the present period of the sawtooth waveform and $t_1$ is the time at which the rectified waveform intersects the sawtooth waveform. Thus the duty cycle of the pulsed waveform 235 is $$D(t_1)=(t_1-t_0)/T, \tag{6c}$$

which is time dependent since the time $t_1$ is varies for each period of the sawtooth waveform 235. The rising portion of the sawtooth waveform 225 can be represented as a line $v_{st}(t)$, i.e., $$v_{st}(t)=(A_{ST}/T)\cdot(t-t_0), \tag{6d}$$

where $A_{ST}$ is the peak voltage of the sawtooth waveform 225. At the intersection point of the rectified waveform 215 and the sawtooth waveform 225, the equation for $v_{st}(t)$ is set equal to $v_r(t)$ at time $t_1$, i.e., $$v_r(t_1)=v_{st}(t_1)=(A_{ST}/T)\cdot(t_1-t_0)=A_{ST}\cdot(t_1-t_0)/T=A_{ST}\cdot D(t_1). \tag{6e}$$

From equation (6e), it can be shown that the duty cycle D(t) is proportional to the amplitude $v_r(t)$ of the rectified voltage waveform 215, i.e., $$D(t_1)=v_r(t_1)/A_{ST}. \tag{6f}$$

Thus, $$D(t)=\alpha \cdot v_r(t) \tag{6g}$$

where $\alpha=1/A_{ST}$, resulting in equation (6) from above.

The average voltage of a square wave is equal to the duty cycle of the signal times the amplitude of the voltage, i.e., $$V_{avg}=D(t) \cdot v_r(t). \tag{7}$$

Because the frequency of the sawtooth waveform 225 is much greater than the frequency of the rectified voltage waveform 215, the period of each pulse of the pulsed waveform 235 is very small as compared to the period of the rectified voltage waveform 215. Because the pulses of the pulsed waveform 235 have very short pulse widths, the change in amplitude value between the beginning and the end of each pulse can be assumed to be very small, and the pulsed waveform 235 can be treated as a square wave. Thus equation (7) above holds for the output of the pulsed waveform generator 130.

Combining equations (5), (6), and (7), it can be shown that $$V_{pw}=\alpha \cdot v^2(t), \tag{8}$$

where $V_{pw}$ is the average voltage of the pulsed waveform 235. It should be understood that the pulsed waveform 235 is representative of the square of the amplitude of the input AC waveform 205. Thus, the area under the curve of pulsed waveform 235 is proportional to the area under the curve of the square of the amplitude v(t) of the input AC waveform 205.

Figures 5E, 5F:
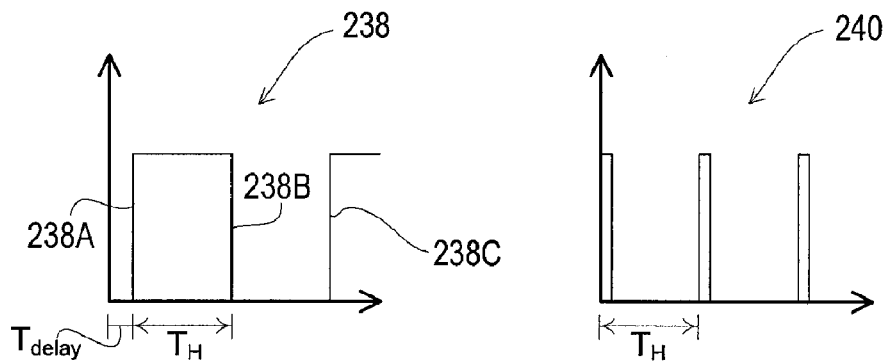

The integrator 140 receives the pulsed waveform 235 as well as a zero-cross pulse waveform 240 (shown in FIG. 5F). The zero-cross pulse waveform 240 is produced by a microcontroller 160 in response to a zero-cross square waveform 238 (shown in FIG. 5E) produced by a zero-cross detector 137. The zero-cross pulse waveform 240 is a train of pulses that may be used by the integrator 140 to reset the integration process at the beginning of each half-cycle. The zero-cross pulse waveform 240 has a frequency of approximately two times the frequency of the input AC waveform 205 (e.g., 120 Hz). Each pulse of the zero-cross pulse waveform 240 corresponds to a zero-crossing of the input AC waveform 205.

The zero-cross square waveform 238 produced by the zero-cross detector 137 has a leading edge (rising edge) 238A that corresponds to the first zero-crossing (from negative to positive half cycle) of the input AC waveform 205; a trailing edge (falling edge) 238B corresponds to the next zero-crossing (from positive to negative half cycle); the next leading edge 238C corresponds to the next zero-crossing, and so on. The zero-cross square waveform 238 has a frequency approximately equal to the frequency of the input AC waveform 205 (e.g., 60 Hz) and a duty cycle of about 50%. The microprocessor 160 is configured to detect the leading and trailing edges of the zero-cross square waveform 238 and to produce the zero-cross pulse waveform 240 in response. Note that the leading and trailing edges of the zero-cross square waveform 238 are delayed slightly by a time $T_{delay}$ from the actual zero-crossing times of the input AC waveform 205 due to an inherent time delay in the circuitry of the zero-crossing detector 137. The microcontroller 160 compensates for this delay and generates the zero-cross pulse waveform 240 having pulses that occur at the actual zero-crossing times of the input AC waveform 205.

The zero-crossing detector 137 provides accurate and reliable detection of the zero crossings Z of the input AC waveform 205 using the technology described in U.S. Pat. Nos. 6,091,205 and 6,380,692, both entitled "Phase controlled dimming system with active filter for preventing flickering and undesired intensity changes." The zero-crossing detector 137 has an active filter for recovering the AC fundamental waveform from the input AC waveform 205 and provides zero-crossing indications of the AC fundamental waveform. The recovered AC fundamental is substantially free of noise or distortion, and of frequency components greater than at least second order harmonics, that may be present on the AC line voltage waveform, and that might otherwise result in faulty or incorrect zero crossing detection.

Figures 5G, 5H:
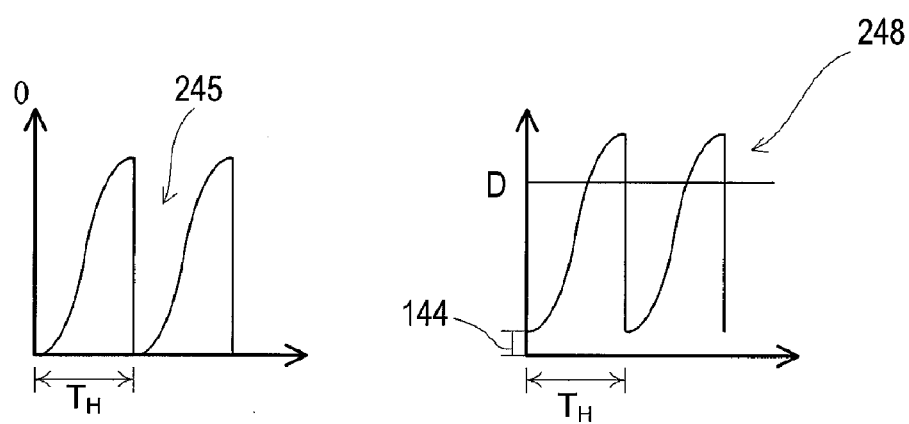
Figure 5I:
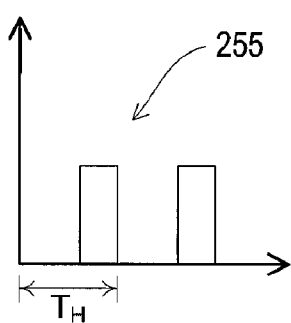

The integrator 140 computes the area under the curve of the pulsed waveform 235 as a function of time. In other words, the integrator 140 integrates the amplitude of the pulsed waveform 235 (i.e., $\alpha \cdot v^2(t)$) over an amount of time, t, from t=0 to t=$T_H$, where t=0 at the zero-crossing and $T_H$ is the period of a half-cycle of the input AC waveform 205. The integration waveform 245 (the output of the integrator 140) is shown in FIG. 5G. The integrator 140 resets itself as described above based on the zero-cross pulse waveform 240 from the microcontroller 160.

In order to improve the accuracy of the integration, the amplitude of the sawtooth waveform 225 may be greater than the largest expected amplitude of the input AC waveform 205, and the frequency of the sawtooth waveform 215 much higher than the frequency of the input AC waveform 205 to eliminate any noticeable jitter in the integrator output. Furthermore, because it is known that the human eye cannot readily discern lighting fluctuations of less than about 20 μsec, it is desirable that the period of the sawtooth wave be less than about 20 μsec (i.e. that the frequency of the sawtooth wave exceed 50 kHz). In this way, the threshold value will be reached within 20 μsec of the time that the threshold amount of energy has been delivered to the load.

In an example embodiment, where the frequency of the input AC waveform 205 is expected to be 50 or 60 Hz, the frequency of the sawtooth waveform 225 may be about 80-110 kHz. In an example embodiment, where the amplitude of the input AC waveform 205 is expected to be brought down from about 120 V to about 4-5 V before it is introduced into the voltage regulation circuit, the amplitude of the sawtooth waveform 225 may be about 6 V.

Using adder 142, a small DC offset voltage 144 is added to the output of the integrator 140 to produce an offset integration waveform 248 (shown in FIG. 5H). The offset integration waveform 248 is then provided to a comparator 150. The small DC offset voltage 144 lifts the integration waveform 245 away from zero, which avoids errors that could occur at the comparator 150 when the integration waveform 245 is low in amplitude.

The comparator 150 compares the level of the offset integration signal 248 out of adder 142 to a pre-selected threshold level D (shown in FIG. 5H) that indicates when to stop delivering electrical energy to the load. The pre-selected threshold level D is produced by the threshold generator 147 based on the duty cycle of a pulse-width modulated (PWM) signal provided by a microcontroller 160. It should be noted that the pre-selected threshold level D could instead be set by a potentiometer or other means not dependent on the microcontroller 160. The pre-selected threshold level D may be expressed as a percentage, and may be based on a desired intensity level associated with the load. Electrical energy is delivered to the load until it has been determined that the amplitude of the offset integration waveform 248 has reached the threshold D (i.e., that a threshold amount of energy has been delivered to the load). When the amplitude of the offset integration waveform 248 reaches the threshold D, the delivery of electrical energy to the load is discontinued. For example, if the load were a lamp set and a user were to set the desired light intensity level of the lamp set to 50%, then the pre-selected threshold would be set to a value that would cause 50% of the energy supplied by the input AC waveform 205 to be delivered to the load during each half-cycle. That is, the threshold D may be expressed as the amount of energy needed to illuminate the light set at the desired intensity level.

As shown in FIG. 5B, both half-cycles of the AC waveform have the same amplitude profile. Consequently, for each half-cycle, the threshold D, shown in FIG. 5H, is reached after the same amount of time from the zero-crossing at the beginning of the half-cycle. Accordingly, in a dimming system supplied with a waveform as shown in FIG. 5B, a dimmer conducting for the same amount of time each half-cycle would deliver about the same amount of electrical energy each half-cycle. Conversely, in a dimming system according to the invention, the threshold D would be reached after about the same amount of time into each half-cycle of such a waveform.

Figure 7:
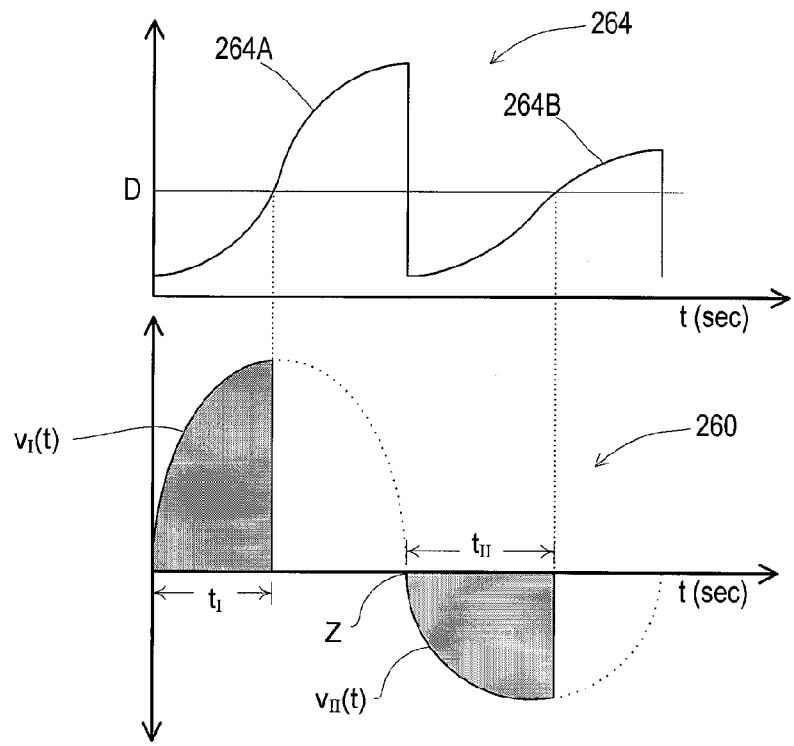
FIG. 7 depicts an example dimmed waveform in accordance with the invention.

FIG. 7 depicts an example dimmed waveform 260 in accordance with the invention, wherein the amplitude profile of the dimmed waveform 260 varies from half-cycle to half-cycle. The controllably conductive device 18 receives the input AC waveform 205 and outputs the dimmed waveform 260. As to waveform 260, the solid line represents the energy level that is actually delivered to the dimmed load 16, and the dotted line represents the portion of the input AC waveform 205 that is not delivered to the load.

During the first half-cycle, the dimmed waveform 260 has a voltage amplitude, $v_I(t)$, and current is delivered to the load for an amount of time $t_I$. Note that current is delivered during the first half-cycle until the amplitude of the offset integration waveform 264 exceeds the threshold level D. Thereafter, the current is gated off, and the delivery of current is discontinued.

During the second half-cycle, the waveform 260 has a voltage amplitude $v_{II}(t)$ that is relatively low compared to the amplitude $v_I(t)$ of the waveform during the first half-cycle. Consequently, during the second half-cycle, current is delivered to the load for an amount of time $t_{II}$ that is longer than $t_I$. The amount of energy delivered to the load, however, is the same for both half-cycles. Note again that current is delivered during the second half-cycle until the amplitude of the integral waveform 264 exceeds the threshold level D. Thereafter, the current is gated off, and the delivery of current is discontinued.

Figure 1:
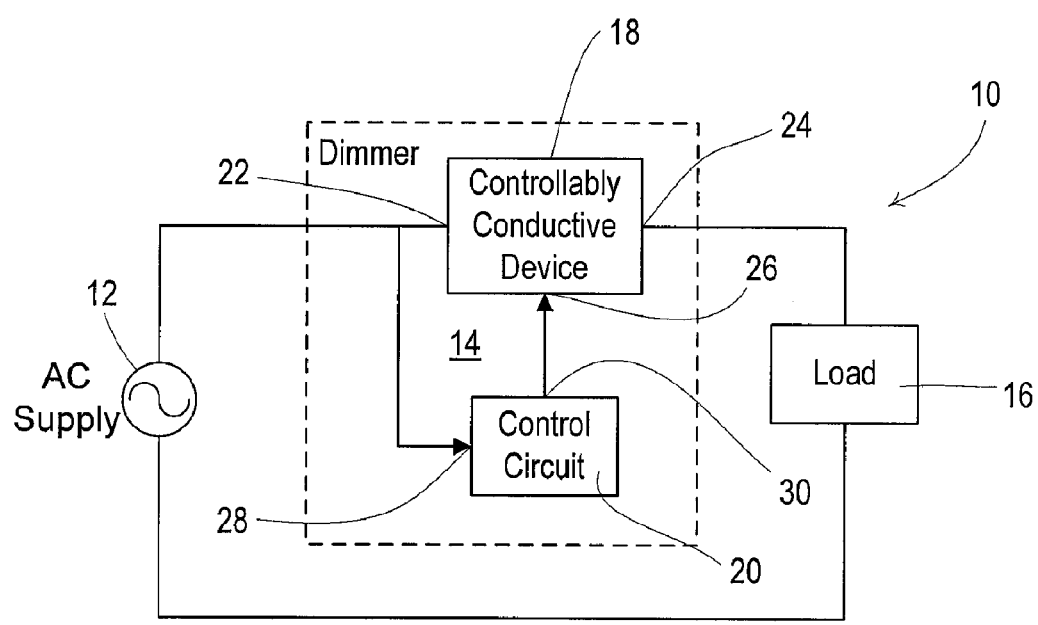
FIG. 1 depicts a typical dimmer circuit.
Figure 2A:
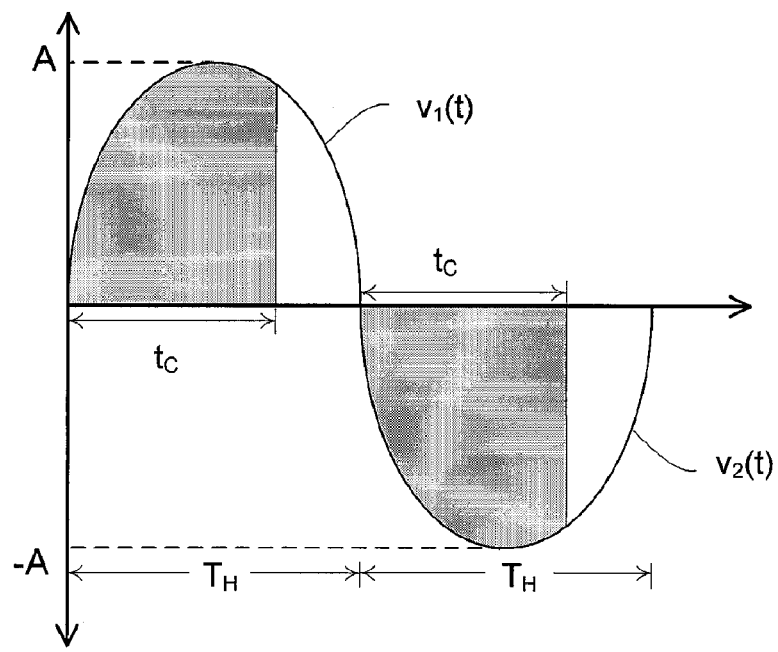
FIGS. 2A and 2B depict example prior art dimmed waveforms.
Figure 2B:
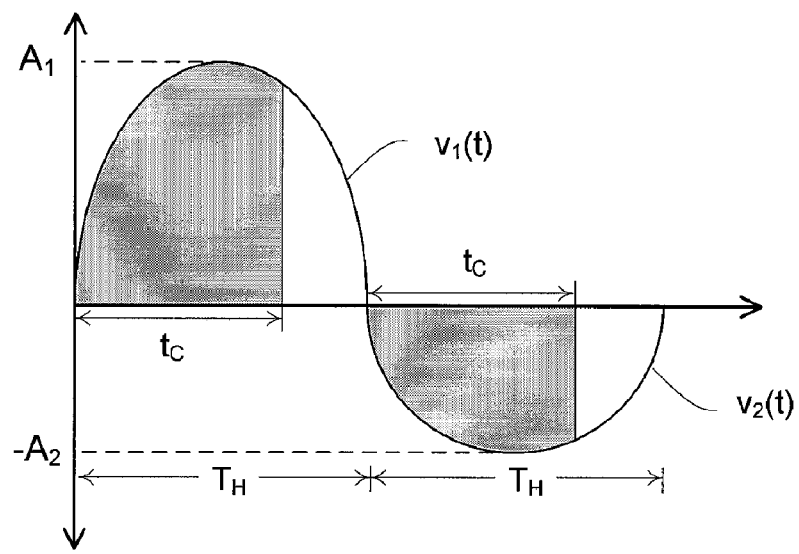

As shown in FIG. 1, the input 28 of the control circuit 20 is connected to the input 22 of the controllably conductive device 18 and receives the input AC waveform 205. With this configuration, the integration continues the entire length of each half-cycle as shown by the offset integration waveform 264 in FIG. 7. However, because the current is gated off when the amplitude of the offset integration waveform 264 exceeds the threshold level D and current does not flow through the controllably conductive device 18 until the next zero-crossing Z, there is no need to perform the integration during this "off" time (for example, the time between $t_I$ and Z in FIG. 7). Thus, the input 28 of the control circuit 20 could alternatively be connected to the output 24 of the controllably conductive device 18 to achieve the same results.

It should be understood that a single-frequency sine wave has been described for simplicity of illustration. In accordance with the invention, the integral of $v^2(t)$ will reflect fluctuations in the amplitude of the input AC waveform by reaching the threshold value sooner or later, depending on whether the amplitude fluctuations caused net energy increases or decreases, respectively.

Referring back to FIG. 4 and FIGS. 5A-I, the comparator 150 outputs a control signal 255 (shown in FIG. 5I) having an amplitude indicative of the comparison of the offset integration signal 248 and the threshold D. For example, the comparator 150 may be configured such that the control signal 255 is a relatively low-voltage signal if the level of the signal out of the integrator is below the threshold, and a relatively high-voltage signal if the level of the signal out of the integrator exceeds the threshold.

The microcontroller 160 receives the control signal 255 out of the comparator 150 and drives the switching device 170 that causes electrical energy to be delivered to the load as long as the control signal 255 is low. The microcontroller 160 does not cause electrical energy to be delivered to the load when the control signal 255 is high. Thus, electrical energy is delivered to the load as long as the offset integration signal 248 is below the threshold D. In other words, electrical energy is delivered to the load until it is determined that the threshold amount of energy has been delivered to the load during the half-cycle. Consequently, roughly the same amount of energy is delivered to the load each half-cycle. Even though the microcontroller 160 is used in the described embodiment to control the operation of the switching device 170, other control circuits could be used here to drive the switching device 170.

It should be understood, of course, that, if the input AC waveform 205 does not provide enough energy in a given half-cycle to deliver the threshold amount of energy to the load, then the microcontroller 160 will not discontinue causing energy to be delivered to the load during that half-cycle, and less than the threshold amount of energy will be delivered to the load during that half-cycle.

FIGS. 8A-E depict schematic diagrams of an example embodiment of the functional block diagram of FIG. 4. The microcontroller 160 may interface with the circuitry of FIGS. 8A-E and provide to the switching device 170 drive signals that control the amount of current delivered to the load.

Figure 8A:
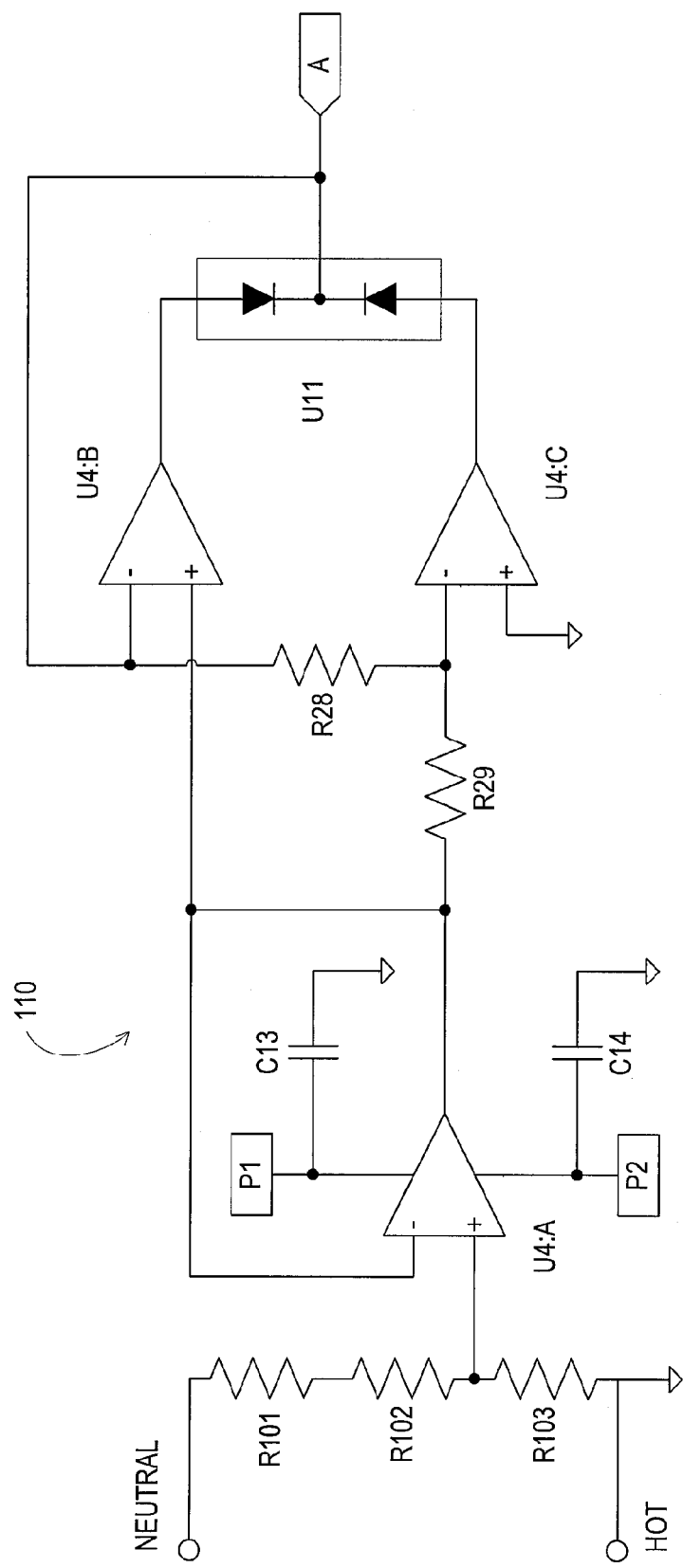
FIGS. 8A-E depict an example schematic diagram for embodying the functional block diagram of FIG. 4.

FIG. 8A shows an example embodiment of the full-wave rectifier 110. The input waveform 205 is provided at the HOT and NEUTRAL terminals. Circuit common for the entire schematic is referenced to the HOT terminal. The input waveform 205 may be scaled down to an acceptable level (preferably about 4.7 volts peak) for the integrated circuits (ICs) in the following stages using resistors R101, R102, and R103. To achieve such a level, resistors R101 and R102 may be 220 kΩ resistors and resistor R103 may be a 12.4 kΩ resistor. The scaled signal may be fed into a voltage follower including an operational amplifier ("op amp") U4:A, which may be an LM224DT, for example, to provide a buffer between the line voltage input AC waveform 205 and the rest of the circuitry. The output of the voltage follower may be rectified using an active full-wave rectifier, including op amps U4:B and U4:C, a dual diode U11, such as a BAV70, and resistors R28 and R29, which may be 100 kΩ resistors. The output of the full-wave rectifier 110 (at node A) is the rectified voltage waveform 215 (in FIG. 5A). Capacitors C13 and C14, which may be 0.1 µF capacitors, may be provided to guard against undesirable noise from the power supplies P1 and P2, which may be ±12V power supplies.

Figure 8B:
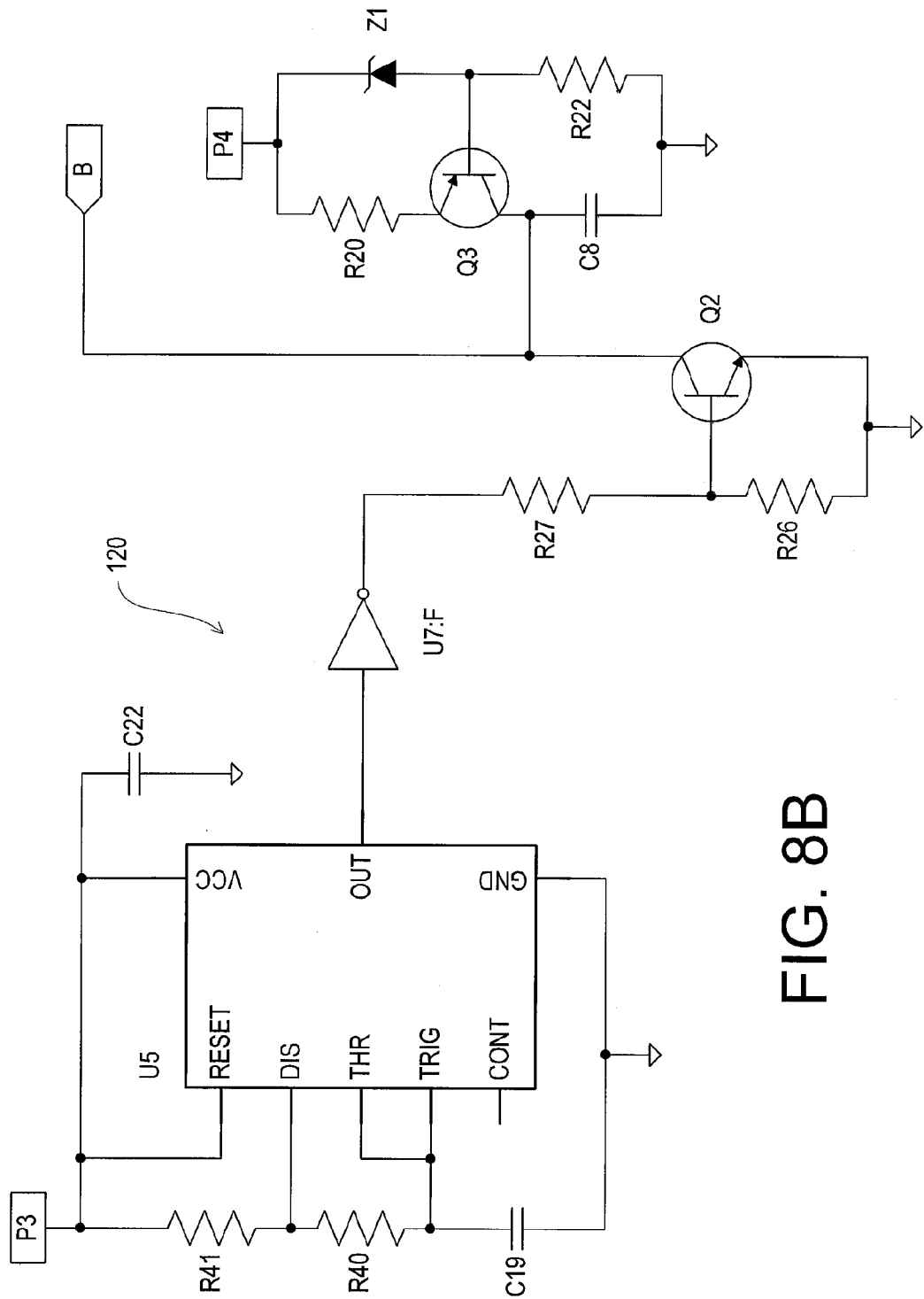

FIG. 8B shows an example embodiment of the sawtooth generator 120. A 555 timer U5, which may be an MC1455B, generates a square wave, having a frequency of approximately 105 kHz and a duty cycle of 95%. The frequency and duty cycle of the square wave are set by the values of resistors R40 and R41, and capacitor C19, which may be 680%, 12.4 kΩ, and 1000 pF, respectively. The output of the 555 timer U5 is inverted using inverter U7:F, which may be an MC74AC14, to obtain a square wave having the same frequency and a 5% duty cycle. A constant current source is provided, via power supply P4, which may be a 12 V power supply, using transistor Q3, which may be a 2N3906, a 3.9 kΩ resistor R20, a 3.3V zener diode Z1, and a 220 kΩ resistor R22, to charge capacitor C8 at a constant dv/dt rate (of approximately 667 kV/sec). The inverted square wave pulses the base of a transistor Q2, which may be an MPSA06, once every 9.6 µsec. Whenever the base of transistor Q2 is high, current flows from the collector to the emitter of transistor Q2 discharging capacitor C8, which may be a 1000 pF capacitor. The combination of the constant dv/dt charging and pulsed discharging of C8 provides the sawtooth waveform 225 (in FIG. 5C) at node B. The sawtooth waveform 225 may have an amplitude of approximately 6.4 volts. A capacitor C22, which may be a 0.1 µF capacitor, may be provided to guard against undesirable noise from the power supply P3, which may be a 5V power supply.

Figure 8C:
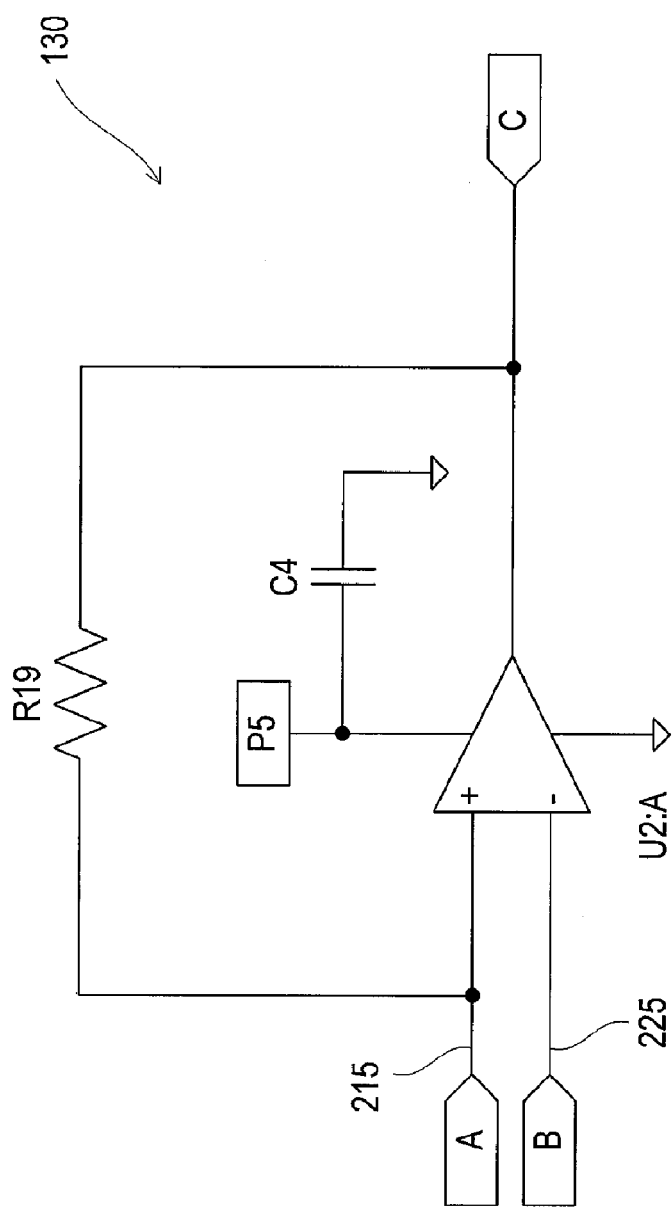

FIG. 8C shows an example embodiment of the pulsed waveform generator 130. The output of the full-wave rectifier 110 may be provided to the positive input of a comparator U2:A, which may be an LM2903D. The output of the sawtooth generator 120 may be provided to the negative input of comparator U2:A. When the output of the rectified voltage waveform 215 is less than the output of the sawtooth waveform 225, then the comparator U2:A outputs a "low" signal (logical zero). When the output of the rectified voltage waveform 215 is greater than the output of the sawtooth waveform 225, then the comparator U2:A outputs a "high" signal, which may be pulled up to the amplitude of the rectified voltage waveform 215 through a resistor R19, which may be a 4.75 kΩ resistor. Thus, the comparator U2:A may generate the pulsed waveform 235 (shown in FIG. 5D) at node C that has a peak amplitude that follows the peak amplitude of the rectified voltage waveform 215 and a duty cycle, D(t), that varies as the amplitude of the rectified voltage waveform 215. That is, as the amplitude $v_R(t)$ of the rectified voltage waveform 215 increases, the pulses out of the pulsed waveform generator 130 become wider (in the time domain) and greater in amplitude (voltage). The output of the pulsed waveform generator 130 is representative of the square of the input AC waveform 205. A capacitor C4, which may be a 0.1 µF capacitor, may be provided to guard against undesirable noise from the power supply P4, which may be a 12V power supply.

Figure 8D:
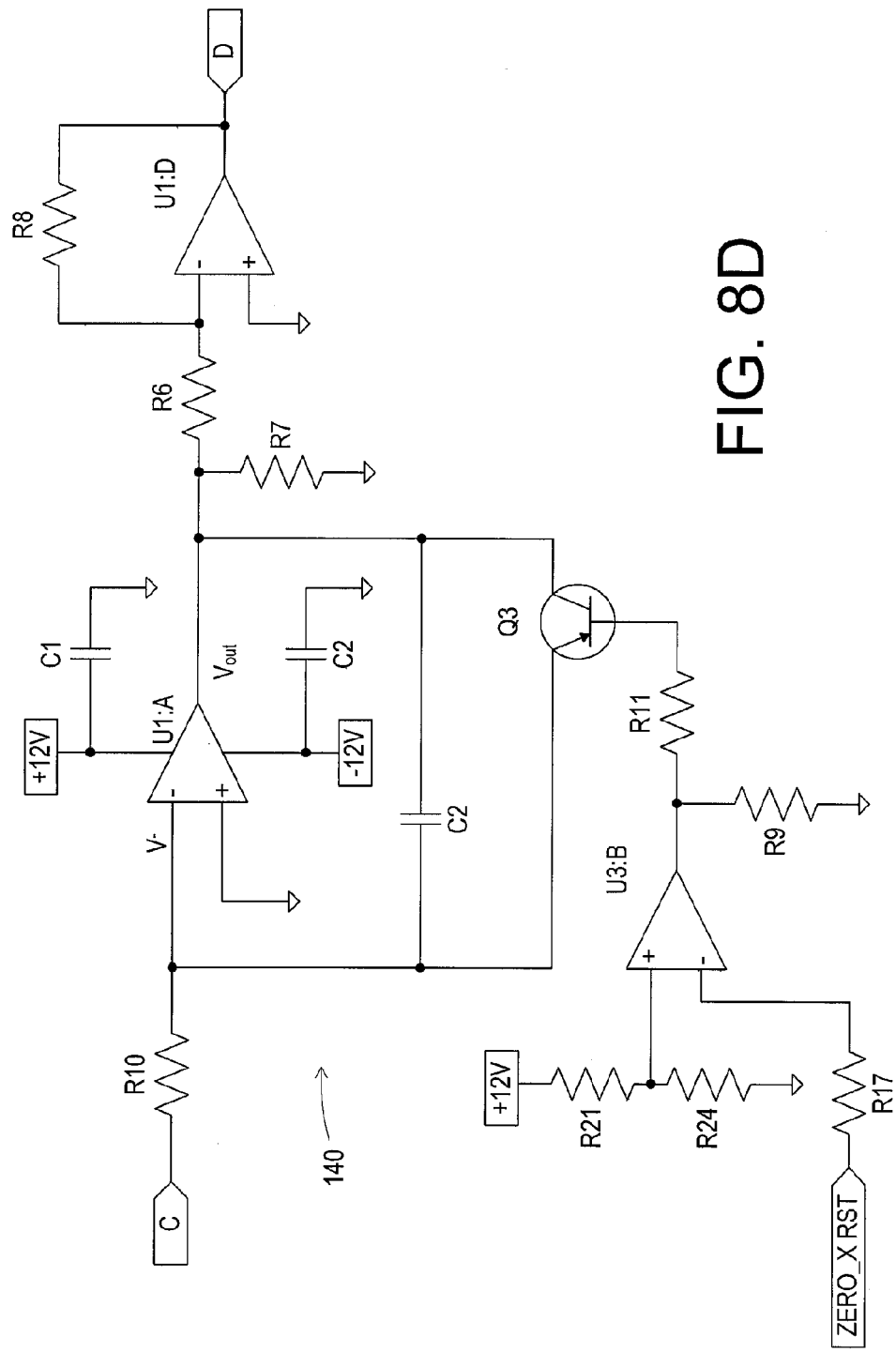

FIG. 8D shows an example embodiment of the integrator 140. The pulsed waveform is provided to an op amp integrator (including LM224DT op amp U1:A, 150 kΩ resistor R10, and 0.1 µF capacitor C2), such that $$V_{out}(t) = \frac{-1}{R_2 C_2} \int V^-(t) dt, \tag{9}$$

where $V_{out}(t)$ is the voltage at the input of op amp U1:A and $V^-(t)$ is the voltage at the inverting input of op amp U1:A and is essentially the pulsed waveform 235 at node C. Because the gain of equation (9) is negative, the output of the op amp integrator is sent to an inverting amplifier stage (including LM224DT op amp U1:D, 10 kΩ resistor R6, and 47 kΩ resistor R8). The signal at the output of the inverting amplifier stage is positive and of greater amplitude than the output of the op amp integrator. To reset the integrator 140 each half cycle, the node ZERO_X RST (or Zero-Cross Reset) provides the zero-cross pulse waveform 240 (shown in FIG. 5F). When the negative input of LM2903D comparator U3:B rises above the voltage threshold set by 100 kΩ resistor R21 and 10 kΩ resistor R24, the output of the comparator goes "low." This causes 2N3906 transistor Q3 to turn on, thus discharging 0.1 uF capacitor C2 and resetting the integration process of the op amp integrator. The output of the integrator 140 (at node D) is the integration waveform 245 (in FIG. 5F).

Figure 8E:
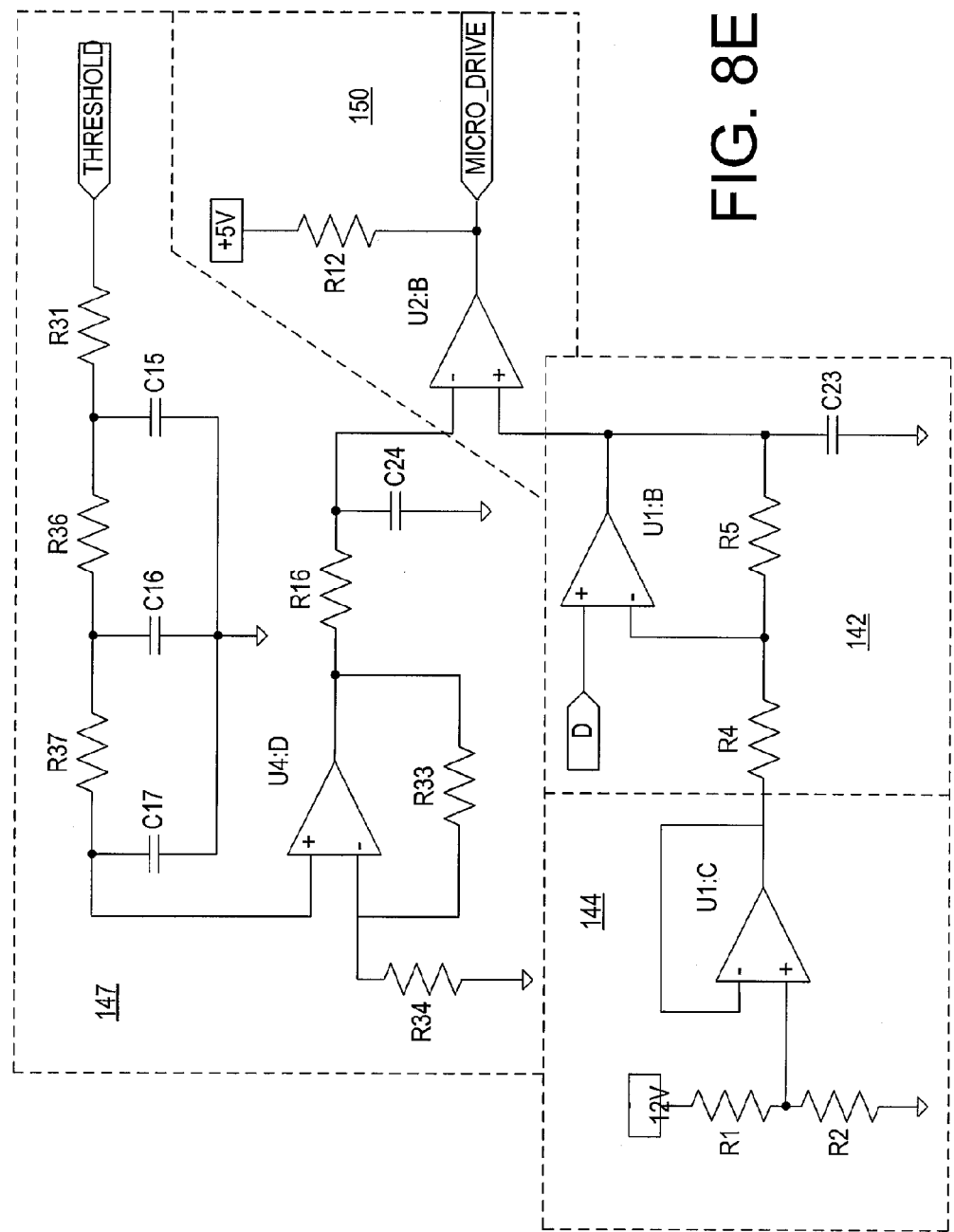

FIG. 8E shows an example embodiment of the threshold generator 147, DC voltage offset 144, adder 142, and comparator 150. The node THRESHOLD provides a pulse-width modulated (PWM) signal from the microcontroller 160. The duty cycle of the PWM signal is controlled by the microcontroller 160. The PWM signal is filtered using a three-stage low-pass filter (including 10 kΩ resistors R31, R36, and R37, and 0.022 µF capacitors C15, C16, and C17), which provides a DC (direct current) voltage level that can be altered by changing the duty cycle of the PWM signal. The filtered voltage at the positive input of LM224DT op amp U4:D is amplified by a non-inverting amplifier (including LM224DT op amp U4:D, and 22 kΩ resistors R33 and R34), thus providing the threshold D as shown in FIG. 5G.

A small DC voltage offset is produced by LM224DT op amp U1:C, 100 kΩ resistor R1, and 2.2 kΩ resistor R2. This small DC voltage offset is added to the integration waveform 245 using LM224DT op amp U1:B and 100 kΩ resistors R4 and R5 to produce the offset integration waveform 248 (shown in FIG. 5G). The offset integration waveform 248 is compared to the threshold D using an LM2903D comparator U2:B, such that the output of the comparator U2:B goes "high" when the offset integration waveform 248 is greater than the threshold D, producing control signal 255 (in FIG. 5H). The control signal 255 is provided to the microcontroller at node MICRO_DRIVE. The microcontroller 160 may use the control signal 255 to determine when to turn off the switching device 170 that controls the amount of current delivered to the load.

Figure 9:
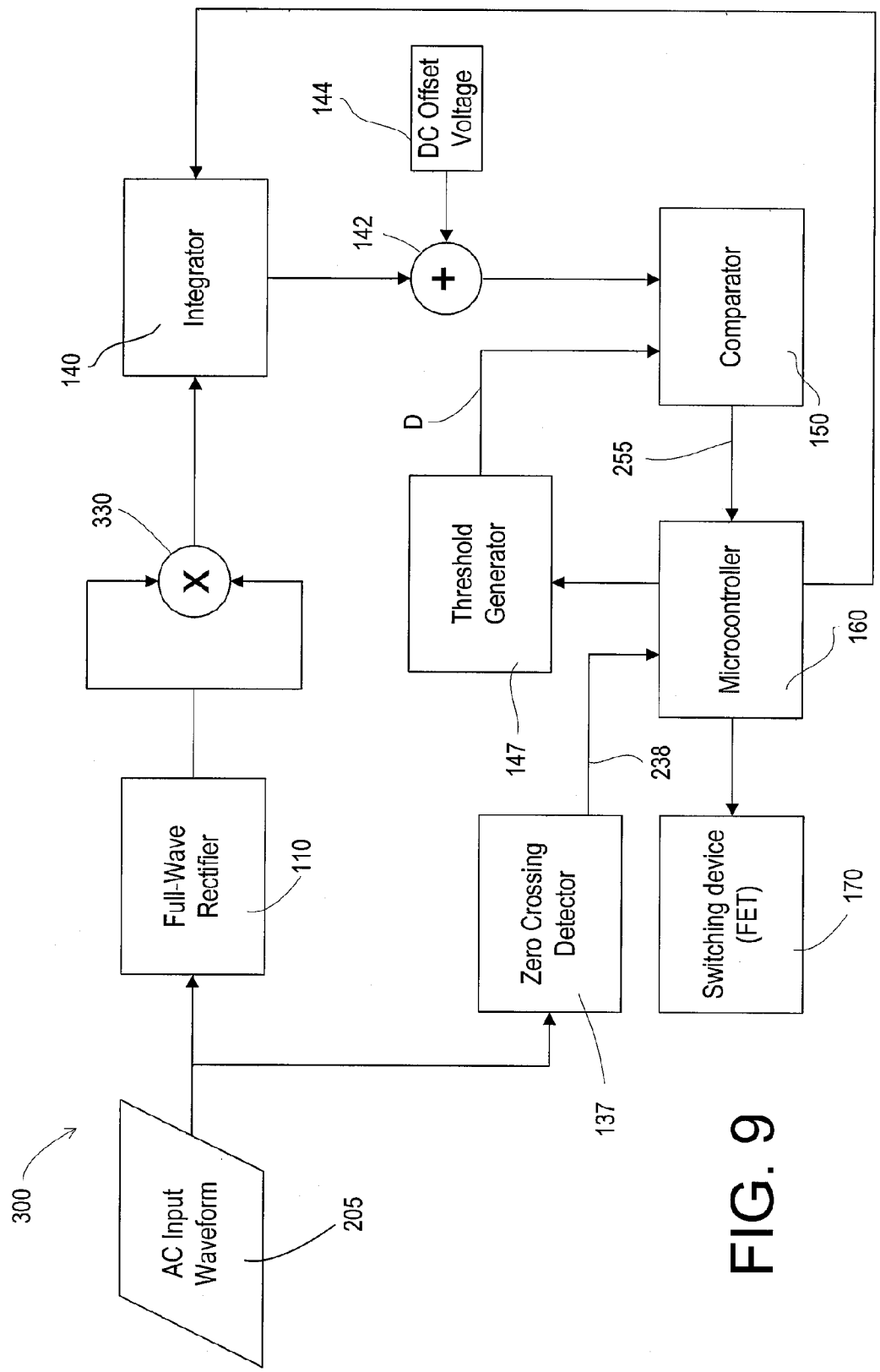
FIG. 9 is a functional block diagram of a system for regulating delivery of electrical energy to a load according to a second embodiment of the invention.

FIG. 9 is a functional block diagram of a system 300 for regulating delivery of electrical energy to a load according to a second embodiment of the invention. The second embodiment may include a multiplier integrated circuit (IC) 330, such as a four-quadrant analog multiplier (part number AD633), manufactured by Analog Devices, Inc. The rectified waveform 215 may be provided to each of two positive signal inputs of the multiplier IC 330 in order to produce the square of the rectified voltage waveform 215. The square of the rectified voltage waveform 215 may then be provided to the input of the integrator 140. The other blocks of FIG. 9 operate as discussed above.

Alternatively, the input signal may be provided directly to the microcontroller. Using well-known techniques, the input signal may be preconditioned to ensure that the signal is acceptable to the microcontroller. The microcontroller may then be programmed to square the waveform and perform the other functions described above.

Figure 10:
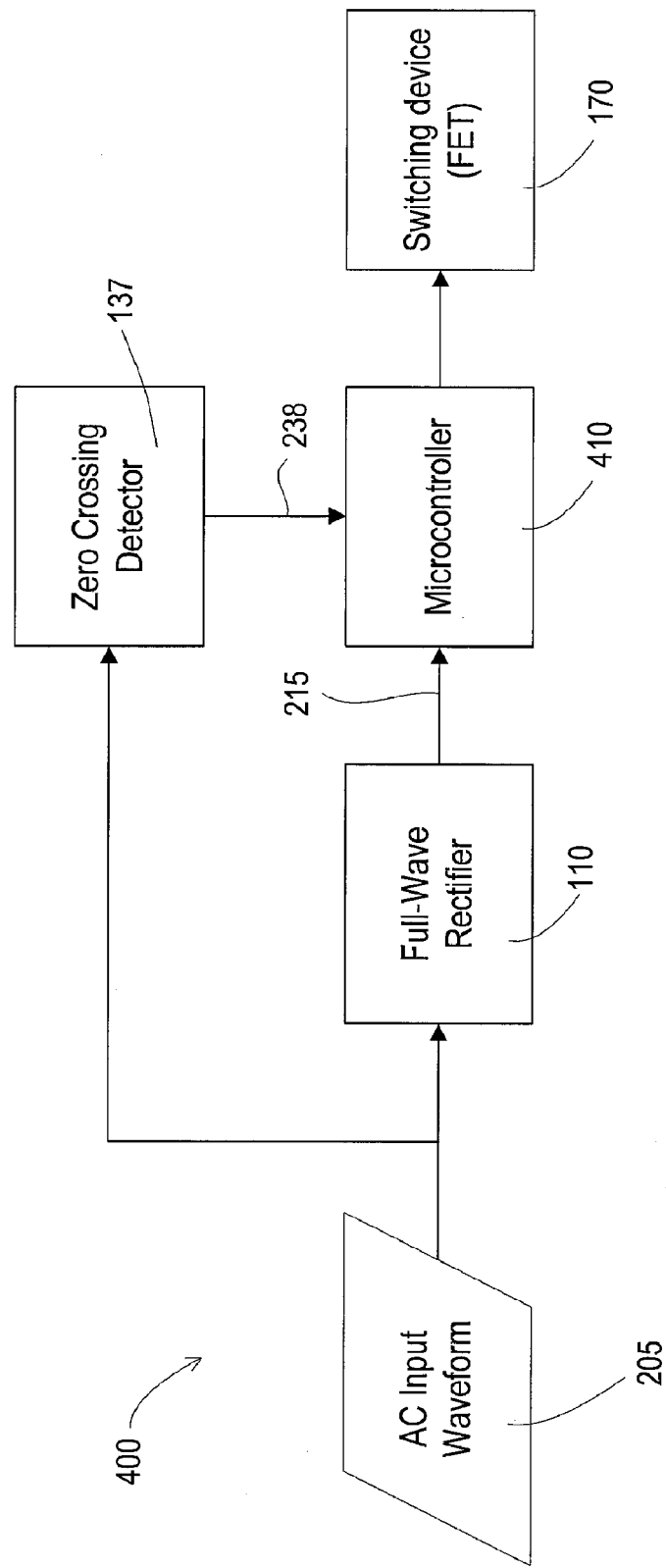
FIG. 10 is a functional block diagram of a system for regulating delivery of electrical energy to a load according to a third embodiment of the invention.

FIG. 10 is a functional block diagram of a system 400 for regulating delivery of electrical energy to a load according to a third embodiment of the invention. In the third embodiment, most of the steps of the method for regulating delivery of electrical energy to a load are executed by software in the microcontroller 410. The microcontroller 410 simply receives the rectified waveform 215 and the zero-cross square waveform 238 from zero-crossing detector 137 and outputs the drive signal to control the switching device 170.

Figure 11:
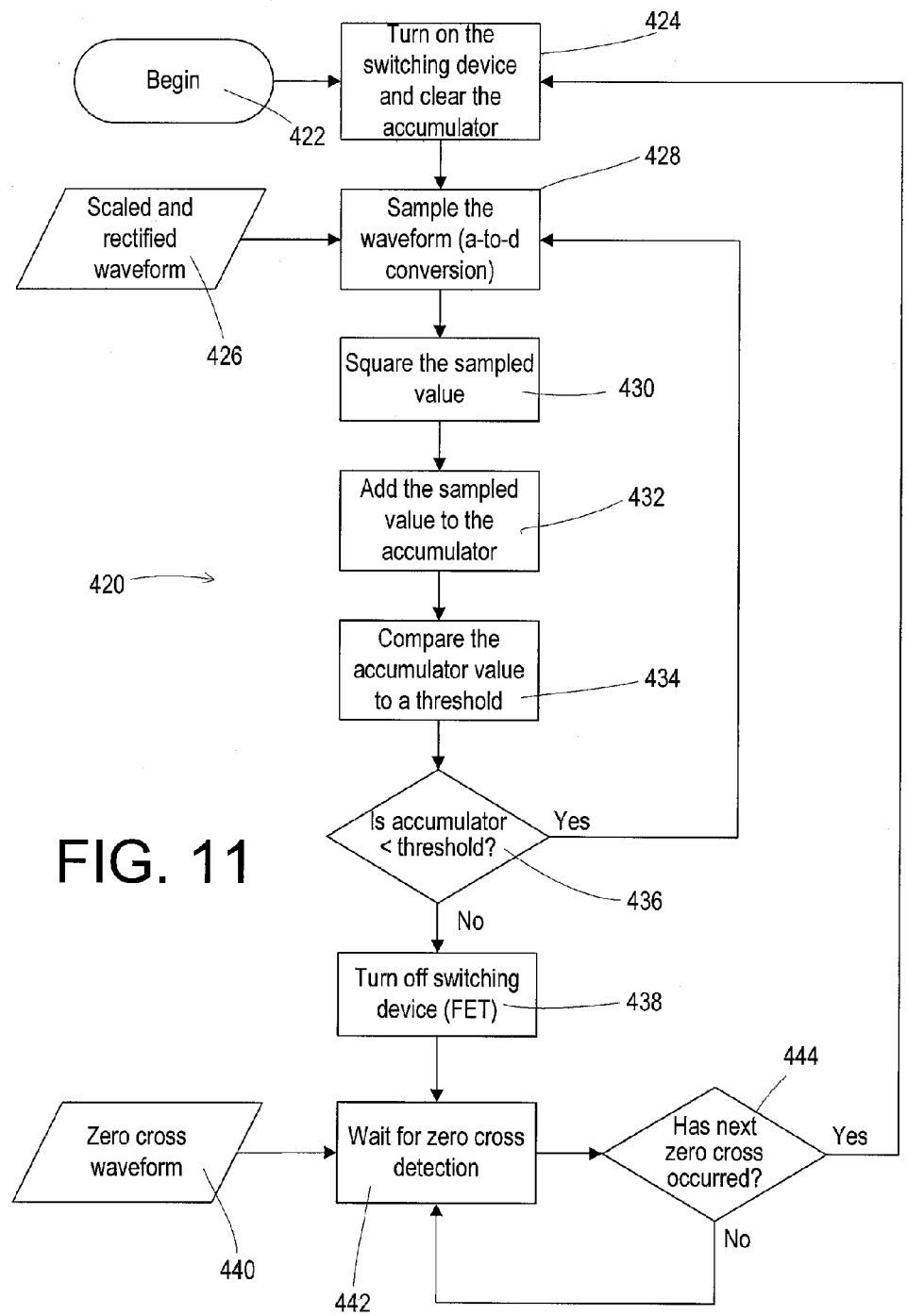
FIG. 11 shows an algorithm for regulating electrical energy delivered to a load according to the third embodiment of the invention.

FIG. 11 shows the algorithm 420 running in microcontroller 410 for regulating electrical energy delivered to a load according to the third embodiment of the invention. The algorithm 420 begins at 422. At step 424, the microcontroller outputs a signal to turn on the switching device 170 and an accumulator (used during the algorithm) is cleared. The rectified voltage waveform 215 is input to the microcontroller at 426 and sampled at 428. The sampled value is squared at 430 and added to the accumulator at 432. At 434, the value of the accumulator is compared to a threshold value that is representative of the amount of energy to be delivered to the load. At 436, if the accumulator value has not exceeded the threshold, the algorithm records another sample of the rectified voltage waveform 215 at 428. Preferably, the sampling occurs every 10 μsec. If the accumulator has exceeded the threshold at 436, the microcontroller then outputs a signal to turn off the switching device 170 at 438. At 442, the microcontroller waits for the next zero-cross detection, provided at 440. At 444, if the next zero-cross has not been detected, the microcontroller continues to wait at 442. Otherwise, the microcontroller repeats the process beginning with turning on the switching device 170 and clearing the accumulator at 424.

Thus there have been described apparatus and methods for regulating the delivery of electrical energy to a load. Other modifications of these apparatus and methods and of their application to the design of electronic dimmers will be readily apparent to one of ordinary skill in the art, but are included within the invention, which is limited only by the scope of the appended claims.

What is claimed:

1. A dimmer for regulating the delivery of electrical energy from a source of electrical energy to a lighting load, the dimmer comprising:
    a controllably conductive device including an input adapted to be coupled to the source of electrical energy, an output adapted to be coupled to the load, and a control input; and
    a control circuit having an input coupled to either the input or the output of the controllably conductive device and an output coupled to the control input of the controllably conductive device,
    wherein the control circuit is operable to
        sample an electrical waveform at a sampling rate to produce a sampled waveform, the sampling rate chosen such that the human eye cannot discern light fluctuations of the lighting load due to the sampling rate;
        generate an integration value by integrating a signal representative of a square of the sampled waveform;
        determine whether the integration value has exceeded a threshold value; and
        cause electrical energy to be delivered to the load until it has been determined that the integration value has exceeded the threshold value.

2. A dimmer according to claim 1, wherein the control circuit is further operable to cause the delivery of electrical energy to the load to be discontinued based on a determination that the integrated voltage has exceeded the threshold value.

3. A dimmer according to claim 1, wherein the threshold value is based on a light intensity associated with the load.

4. A dimmer according to claim 1, wherein the electrical waveform is an alternating-current waveform.

5. A dimmer according to claim 4, wherein the threshold value represents an amount of energy to be delivered to the load during a half-cycle of the alternating-current waveform.

6. A dimmer according to claim 4, wherein the control circuit is further operable to identify a zero-crossing of the alternating-current waveform, and to compute the integration value for an amount of time beginning at the zero-crossing.

7. A dimmer according to claim 1, wherein the sampling rate is greater than approximately 50 kHz.

8. A dimmer according to claim 7, wherein the sampling rate is approximately 100 kHz.

9. A dimmer according to claim 1, wherein the electrical waveform is sampled at least approximately every 20 μsec.

10. A dimmer according to claim 9, wherein the electrical waveform is sampled approximately every 10 μsec.

11. A dimmer for regulating the delivery of electrical energy from a source of electrical energy to a lighting load, the dimmer comprising:
    a controllably conductive device including an input adapted to be coupled to the source of electrical energy, an output adapted to be coupled to the load, and a control input; and
    a control circuit having an input coupled to either the input or the output of the controllably conductive device and an output coupled to the control input of the controllably conductive device;
    wherein the control circuit comprises
        a sawtooth wave generator that generates a sawtooth waveform;
        a first comparator that receives an absolute-value waveform having an amplitude representative of the absolute value of the amplitude of an electrical waveform and the sawtooth waveform and outputs a voltage-square pulse train based on a comparison of the absolute-value waveform and the sawtooth wave;
        an integrator that receives the voltage-square pulse train and generates an integration signal based on the voltage-square pulse train; and
        a second comparator that receives the integration signal and outputs a control signal based on a comparison of the integration signal and a threshold value; and
    wherein the controllably conductive device is responsive to the control signal to regulate delivery of electrical energy to the load.

12. A dimmer according to claim 11, wherein the integrator receives a pulse waveform having a nominal frequency and generates the integration signal based on the voltage-square pulse train and the pulse waveform.

13. A dimmer according to claim 11, wherein the integration signal has an amplitude, and wherein the control signal comprises a first state when the amplitude of the integration signal is below a threshold value and a second state when the amplitude of the integration signal exceeds the threshold value.

14. A dimmer according to claim 13, wherein the control circuit further comprises a drive circuit having an input coupled to the output of the second comparator and an output coupled to the control input of the controllably conductive device, and wherein the drive circuit causes electrical energy to be delivered to the load responsive to the first state and causes delivery of electrical energy to be discontinued responsive to the second state.

15. A dimmer according to claim 11, wherein the electrical waveform is an alternating-current waveform.

16. A dimmer according to claim 15, further comprising a rectifier that receives the alternating-current waveform and generates the absolute-value waveform.

17. A dimmer for regulating the delivery of electrical energy from a source of electrical energy to a lighting load, the dimmer comprising:
   a controllably conductive device including an input adapted to be coupled to the source of electrical energy, an output adapted to be coupled to the load, and a control input; and
   a control circuit having an input coupled to either the input or the output of the controllably conductive device and an output coupled to the control input of the controllably conductive device,
   wherein the control circuit is operable to
      receive an electrical waveform;
      integrate a pulsed waveform representative of a square of the amplitude of the electrical waveform to generate an integration value;
      determine whether the integration value has exceeded a threshold value; and
      cause electrical energy to be delivered to the load until it has been determined that the integration value has exceeded the threshold value.

18. A dimmer according to claim 17 wherein the pulsed waveform has a duty cycle that varies as a function of the amplitude of the electrical waveform.

19. A dimmer according to claim 17 wherein the pulsed waveform comprises a sequence of pulses, each said pulse having a pulse width and pulse amplitude based on an instantaneous amplitude of the electrical waveform.

20. A dimmer according to claim 19, wherein each said pulse has a pulse width and pulse amplitude based on a comparison between a sawtooth waveform and a waveform having an amplitude representative of the absolute value of the amplitude of the electrical waveform.

21. A computer-readable medium having stored thereon computer-executable instructions for performing a method for regulating electrical energy delivered to a lighting load, the method comprising:
   receiving an alternating-current waveform;
   generating a rectified waveform from the alternating-current waveform;
   generating a voltage-square pulse train based on a comparison of the rectified waveform and a sawtooth waveform, the voltage-square pulse train representative of a square of an amplitude of the alternating-current waveform; and
   integrating the voltage-square pulse train over an amount of time to generate an integration signal representative of energy delivered by the alternating-current waveform to the lighting load over the amount of time.

22. A dimmer for regulating delivery of electrical energy to a lighting load, the dimmer comprising:
   a controllably conductive device that regulates delivery of electrical energy to the load;
   a rectifier that generates a rectified waveform having an amplitude based on the absolute value of the amplitude of a received alternating-current waveform; and
   a microcontroller programmed to periodically sample the rectified waveform at a sampling rate to obtain a plurality of sample values, the sampling rate chosen such that the human eye cannot discern light fluctuations of the lighting load due to the sampling rate, the microcontroller further programmed to square the sample values to obtain a plurality of squared-sample values, to integrate the squared-sample values to obtain an integration value, to compare the integration value to a threshold value that is representative of the amount of energy to be delivered to the load to determine, whether a threshold amount of electrical energy has been delivered to the load, and to cause the controllably conductive device to regulate delivery of electrical energy to the load based on the determination.

23. A dimmer according to claim 22, further comprising:
   a zero-crossing detector that provides a zero-cross signal to the microcontroller, the zero-cross signal identifying zero-crossings of the alternating-current waveform,
   wherein the microcontroller causes the controllably conductive device to begin delivering electrical energy to the load at the zero-crossings.

24. A dimmer according to claim 22, wherein the sampling rate is greater than approximately 50 kHz.

25. A dimmer according to claim 23 wherein the microcontroller accumulates the squared-sample values to obtain the integration value.

26. A dimmer according to claim 25, wherein, if the integration value exceeds the threshold value, the microcontroller outputs a signal that causes the controllably conductive device to discontinue delivery of electrical energy to the load.

27. A dimmer according to claim 24, wherein the sampling rate is approximately 100 kHz.

28. A dimmer according to claim 22, wherein the electrical waveform is sampled at least approximately every 20 µsec.

29. A dimmer according to claim 28, wherein the electrical waveform is sampled approximately every 10 µsec.

30. A computer-readable medium having stored thereon computer-executable instructions for performing a method for regulating electrical energy delivered to a lighting load, the method comprising:
   sampling an electrical waveform at a sampling rate to produce a sampled waveform, the sampling rate chosen such that the human eye cannot discern light fluctuations of the lighting load due to the sampling rate;
   squaring the sampled waveform to form a squared-amplitude waveform;
   generating an integration value by integrating the squared-amplitude waveform over an amount of time;
   determining whether the integration value has exceeded a threshold value; and
   causing electrical energy to be delivered to the load at least until it has been determined that the integration value has exceeded the threshold value.

31. A computer-readable medium having stored thereon computer-executable instructions for performing a method for regulating electrical energy delivered to a lighting load, the method comprising:
   sampling an electrical waveform at a sampling rate to produce a sampled waveform, the sampling rate chosen such that the human eye cannot discern light fluctuations of the lighting load due to the sampling rate;

squaring the sampled waveform to form a squared-amplitude waveform;
generating an integration value by integrating the squared-amplitude waveform over an amount of time;
determining from the integration value whether a threshold amount of energy has been delivered to the load; and
causing electrical energy to be delivered to the load at least until it has been determined that the threshold amount of energy has been delivered to the load.

32. A method for regulating delivery of electrical energy to a lighting load, the method comprising:
receiving an electrical waveform;
generating an integration value representative of an integral of a square of an amplitude of the received electrical waveform by integrating a pulsed waveform representative of the square of the amplitude of the received electrical waveform;
determining from the integration value whether a threshold amount of electrical energy has been delivered to the load; and
causing electrical energy to be delivered to the load at least until it has been determined that the threshold amount of energy has been delivered to the load.

33. The method of claim 32, wherein
the pulsed waveform has a duty cycle that varies as a function of the amplitude of the received electrical waveform.

34. The method of claim 32, wherein
the pulsed waveform comprises a sequence of pulses, each said pulse having a pulse width and pulse amplitude based on an instantaneous amplitude of the received electrical waveform.

35. The method of claim 34, wherein each said pulse has a pulse width and pulse amplitude based on a comparison between a sawtooth waveform and a waveform having an amplitude representative of the absolute value of the amplitude of the received electrical waveform.

36. A method for regulating delivery of electrical energy to a lighting load, the method comprising:
sampling an electrical waveform at a sampling rate to produce a sampled waveform, the sampling rate chosen such that the human eye cannot discern light fluctuations of the lighting load due to the sampling rate;
generating an integration value by integrating a signal representative of a square of the sampled waveform;
determining whether the integration value has exceeded a threshold value;
causing electrical energy to be delivered to the load until it has been determined that the integration value has exceeded the threshold value; and
causing the delivery of electrical energy to the load to be discontinued based on a determination that the integrated voltage has exceeded the threshold value.

37. A method for regulating delivery of electrical energy to a lighting load, the method comprising:
detecting a zero-crossing of an alternating-current waveform;
sampling the alternating-current waveform at a sampling rate to produce a sampled waveform, the sampling rate chosen such that the human eye cannot discern light fluctuations of the lighting load due to the sampling rate;
generating an integration value by integrating, for an amount of time beginning at the zero-crossing, a waveform representative of a square of the sampled waveform;
causing electrical energy to be delivered to the load for the amount of time; and
then causing the delivery of electrical energy to be discontinued,
wherein the amount of time is defined such that an amount of electrical energy delivered to the load since the detection of the zero-crossing corresponds to a threshold.

38. The method of claim 37, further comprising:
detecting a second zero-crossing of the alternating-current waveform;
causing electrical energy to be delivered to the load for a second amount of time from the second zero-crossing; and
then causing the delivery of electrical energy to be discontinued,
wherein the second amount of time is different from the first amount of time.

39. The method of claim 38, wherein the second amount of time is defined such that an amount of electrical energy delivered to the load since the detection of the second zero-crossing corresponds to the threshold.

40. A method for regulating delivery of electrical energy to a lighting load, the method comprising:
sampling an electrical waveform at a sampling rate to produce a sampled waveform, the sampling rate chosen such that the human eye cannot discern light fluctuations of the lighting load due to the sampling rate;
squaring the the sampled waveform to form a squared-amplitude waveform;
generating an integration value by integrating the squared-amplitude waveform over an amount of time;
determining whether the integration value has exceeded a threshold value; and
causing electrical energy to be delivered to the load at least until it has been determined that the integration value has exceeded the threshold value.

41. The method of claim 40, further comprising:
causing the delivery of electrical energy to be discontinued after it has been determined that the integration value has exceeded the threshold value.

42. The method of claim 40, wherein the sampling rate is greater than approximately 50 kHz.

43. The method of claim 42, wherein the sampling rate is approximately 100 kHz.

44. The method of claim 40, wherein the step of sampling an electrical waveform further comprises sampling the electrical waveform at least approximately every 20 μsec.

45. The method of claim 44, wherein the step of sampling an electrical waveform further comprises sampling the electrical waveform approximately every 10 μsec.

46. A method for estimating energy delivered by an alternating-current waveform to a lighting load, the method comprising:
receiving an alternating-current waveform;
generating a rectified waveform from the alternating-current waveform;
generating a voltage-square pulse train based on a comparison of the rectified waveform and a sawtooth waveform, the voltage-square pulse train representative of a square of an amplitude of the alternating-current waveform; and
integrating the voltage-square pulse train over an amount of time to generate an integration signal representative of energy delivered by the alternating-current waveform to the lighting load over the amount of time.

47. The method of claim 46, wherein the voltage-square pulse train has a duty-cycle that varies as a function of an amplitude of the rectified waveform.

48. The method of claim 46, wherein the voltage-square pulse train has a duty-cycle that varies as a function of time.

49. The method of claim 46, wherein the voltage-square pulse train includes a sequence of pulses, each said pulse having a respective pulse width and pulse amplitude that vary as a function of an instantaneous amplitude of the rectified waveform.

50. The method of claim 49, wherein integrating the voltage-square pulse train comprises summing time-amplitude products associated with the pulses beginning at a time associated with a zero-crossing of the alternating-current waveform.

51. The method of claim 46, wherein the rectified waveform has an amplitude representative of the absolute value of the amplitude of the alternating-current waveform.

52. The method of claim 46, wherein the sawtooth waveform has a frequency that exceeds a frequency of the rectified waveform.

53. The method of claim 46, wherein the sawtooth waveform has an amplitude that exceeds an amplitude of the rectified waveform.

54. A method for regulating delivery of electrical energy to a lighting load, the method comprising:
    sampling an electrical waveform at a sampling rate to produce a sampled waveform, sampling rate chosen such that the human eye cannot discern light fluctuations of the lighting load due to the sampling rate;
    squaring the the sampled waveform to form a squared-amplitude waveform;
    generating an integration value by integrating the squared-amplitude waveform over an amount of time;
    determining from the integration value whether a threshold amount of energy has been delivered to the load; and
    causing electrical energy to be delivered to the load at least until it has been determined that the threshold amount of energy has been delivered to the load.

55. A computer-readable medium having stored thereon computer-executable instructions for performing a method for regulating electrical energy delivered to a lighting load, the method comprising:
    sampling an electrical waveform at a sampling rate to produce a sampled waveform, the sampling rate chosen such that the human eye cannot discern light fluctuations of the lighting load due to the sampling rate;
    generating an integration value representative of an integral of a square of the sampled waveform;
    determining from the integration value whether a threshold amount of electrical energy has been delivered to the load; and
    causing electrical energy to be delivered to the load at least until it has been determined that the threshold amount of energy has been delivered to the load.

56. A computer-readable medium having stored thereon computer-executable instructions for performing a method for regulating electrical energy delivered to a lighting load, the method comprising:
    sampling an electrical waveform at a sampling rate to produce a sampled waveform, the sampling rate chosen such that the human eye cannot discern light fluctuations of the lighting load due to the sampling rate;
    generating an integration value representative of an integral of a square of the sampled waveform;
    determining whether the integration value has exceeded a threshold value;
    causing electrical energy to be delivered to the load until it has been determined that the integration value has exceeded the threshold value; and
    causing the delivery of electrical energy to the load to be discontinued based on a determination that the integrated voltage has exceeded the threshold value.

57. A computer-readable medium having stored thereon computer-executable instructions for performing a method for regulating electrical energy delivered to a lighting load, the method comprising:
    detecting a zero-crossing of an alternating-current waveform;
    sampling the alternating-current waveform at a sampling rate to produce a sampled waveform, the sampling rate chosen such that the human eye cannot discern light fluctuations of the lighting load due to the sampling rate;
    generating an integration value by integrating, for an amount of time beginning at the zero-crossing, a waveform representative of a square of the sampled waveform;
    causing electrical energy to be delivered to the load for the amount of time; and
    then causing the delivery of electrical energy to be discontinued,
    wherein the amount of time is defined such that an amount of electrical energy delivered to the load since the detection of the zero-crossing corresponds to a threshold.

58. A method for regulating delivery of electrical energy to a lighting load, the method comprising:
    sampling an electrical waveform at a sampling rate to produce a sampled waveform, the sampling rate chosen such that the human eye cannot discern light fluctuations of the lighting load due to the sampling rate;
    generating an integration value representative of an integral of a square of the sampled waveform;
    determining from the integration value whether a threshold amount of electrical energy has been delivered to the load; and
    causing electrical energy to be delivered to the load at least until it has been determined that the threshold amount of energy has been delivered to the load.

59. The method of claim 58, further comprising:
    causing the delivery of electrical energy to the load to be discontinued based on a determination that the threshold amount of energy has been delivered to the load.

60. The method of claim 58, wherein the threshold value is based on a light intensity associated with the load.

61. The method of claim 58, wherein the received electrical waveform is an alternating-current waveform and the threshold amount of energy represents an amount of energy to be delivered to the load during a half cycle of the alternating-current waveform.

62. The method of claim 61, further comprising:
    identifying a zero-crossing of the alternating-current waveform; and
    generating the integration value for an amount of time beginning at the zero-crossing.

63. The method of claim 58, wherein the step of sampling an electrical waveform further comprises sampling the electrical waveform at least approximately every 20 μsec.

64. The method of claim 63, wherein the step of sampling an electrical waveform further comprises sampling the electrical waveform approximately every 10 μsec.

65. The method of claim 58, wherein the sampling rate is greater than approximately 50 kHz.

66. The method of claim 65, wherein the sampling rate is approximately 100 kHz.

* * * * *